United States Patent

[11] 3,615,341

| [72] | Inventor | Rolf Rolles<br>New Kensington, Pa. |
|------|----------|------------------|
| [21] | Appl. No. | 781,265 |
| [22] | Filed | Dec. 4, 1968 |
| [45] | Patented | Oct. 26, 1971 |
| [73] | Assignee | Aluminum Company of America<br>Pittsburgh, Pa. |

[54] NONLEAFING METALLIC FLAKE PIGMENT
8 Claims, No Drawings

[52] U.S. Cl. .................................................. 75/0.5 A,
106/290
[51] Int. Cl. .................................................. B22f 9/00,
C09c 1/64

[50] Field of Search .......................................... 75/0.5;
106/290; 260/448

[56] References Cited
UNITED STATES PATENTS

| 3,085,890 | 4/1963 | Rolles ........................ | 106/290 |
| 3,234,038 | 2/1966 | Stephens et al. .............. | 106/290 |
| 3,474,464 | 10/1969 | Matthews et al. ............. | 260/448 |

*Primary Examiner*—L. Dewayne Rudledge
*Assistant Examiner*—W. W. Stallard
*Attorney*—Abram W. Hatcher

ABSTRACT: Use of acetylacetone to remove undesirable parent metal and iron fines from nonleafing metallic flake pigments.

NONLEAFING METALLIC FLAKE PIGMENT

BACKGROUND OF THE INVENTION

This invention relates to metallic flake pigments. More particularly it relates to nonleafing metallic flake pigments useful in coating compositions substantially devoid of streak-producing, discoloring colloidal metallic inclusions which detract from the reflective brilliance, natural metallic color, depth of image and gloss of such compositions.

Metallic flake pigments, particularly nonleafing aluminum flake pigments, are for the most part manufactured by two basic processes, wet ball-milling and dry hammer-milling. Nonleafing aluminum flake pigments produced by the aforesaid two conventional processes have been improved by following the practice of the invention as hereinafter described.

Probably the most widely employed commercial process for producing metallic flake pigments is the aforementioned conventional wet ball-milling operation in which relatively small substantially spheroidal atomized metallic particles, or substantially flat foillike pieces of the metal, are charged into the cylindrical steel shell of a ball mill in the presence of a quantity of steel impact balls, a charge of conventional nonleafing fatty acid lubricant or grease, and a quantity of volatile hydrocarbon solvent, the ball mill being rotated a sufficient time, preferably between 6 and 16 hours, to produce a slurry or sludge mass in which the milled metal has been reduced to the desired particle size characterized by conventionally acceptable flakelike particles or lamellae having a surface coating or film layer of conventional nonleafing grease or lubricant.

The sludge or slurry so produced is preferably passed through one or more screens to remove agglomerates and oversized particles. A substantial quantity of the volatile hydrocarbon solvent is thereafter removed by filtration to provide a damp filter cake of the nonleafing metallic particles. Adjustment of the damp filter cake by addition thereto of a quantity of clean volatile hydrocarbon solvent, with or without additional convention nonleafing lubricant or grease, is normally carried out to provide conventional commercial metallic paste pigment formulations of the approximate composition by weight 60 to 85 percent metallic flakes, 0.5 to 8 percent nonleafing fatty acid lubricant or grease distributed on the flake surfaces, and 14.5 to 32 percent volatile hydrocarbon solvent. Such paste pigment formulations are regularly marketed and employed for addition thereof to compatible natural and synthetic lacquers and varnishes in the manufacture of paints, inks and similar metallic pigmented flowable coating formulations.

The damp filter cake products above referred to may be, if desired, and are being, regularly commercially converted to dry powder nonleafing metallic flake pigments by removal of the volatile hydrocarbon solvent content thereof, for example, by means of a vacuumizing drying step, in their commercial production.

Dry metallic flake powder pigments are also producible by other means, a regularly employed commercial process comprising use of a hammer mill provided with cooperating, preferably curvilinearly contoured, steel impact hammers and steel anvil surfaces between which a charge of metal particles is reduced to flake particles of desired size in the presences of a conventional nonleafing grease or lubricant which forms a film layer on the surfaces of the particles thus produced.

Significant of the conventional processes stated above in the commercial manufacture of nonleafing metallic flake pigments is the employment of equipment constructed from the ferrous metals iron and/or steel. Such equipment is in universal use in the pigment industry and it is invariably responsible for the production of and inclusion in the metallic flake pigments manufactured therein of substantial quantities of ferrous fines. These result from continued impact and the grinding action between the ferrous surfaces performing disintegration of the metallic pigments. It has also been observed that quantities of pigment fines are produced in the above-described conventional hammer and ball-milling processes, which neither exhibit nor benefit the desired qualities attributable to the flakelike particles of acceptable metallic pigments. In fact, the deleterious ferrous and parent pigment metal fines have been found to be present in the flake pigments conventionally produced in this manner in total amount of about 0.01 to about 1 percent by weight of the desired flake pigment.

The undesirable presence or inclusion of ferrous and parent metallic fines in dry powder and paste metallic pigments manifests itself in dried films of paints, inks and similar flowable coatings formulated therefrom in the form of random streaks and blotches of color and varying reflective brilliance which are in contrast to the natural color and metallic brilliance associated with the parent metal of the flake pigments. In addition to being undesirable for color purity reasons, iron fines contribute substantially to vehicle seeding. For example, colloidal iron has a catalytic effect on organic polymers. In the presence of finely divided iron, some synthetic resins polymerize to insoluble gel particles which produce resin seeds. These seeds reduce the gloss of, and are detrimental to the appearance of, the finish of the article to which a coating containing aluminum flake pigments is applied.

SUMMARY AND OBJECTS OF THE INVENTION

One object of this invention is therefore to substantially eliminate undesirable ferrous and parent metallic fine inclusions in the production of nonleafing metallic flake pigment. A further object of the invention is to provide a relatively simple and economical way to use existing conventional metallic flake pigment processing equipment while at the same time alleviating the deleterious properties attributable to the presence of ferrous and parent metallic pigment fines in as-manufactured metallic flake pigments. Other objects and advantages will be appreciated and understood by those versed in the art to which the invention is addressed on further consideration of the detailed description hereinafter and appended claims.

It has been my discovery that the undesirable ferrous and parent metallic pigment fines in metallic flake pigments are colloidal and microscopic in size as compared to the average particle sizes of the metallic flakes which insure a high-quality metallic flake pigment; that the objectionable fines are insoluble, nondiffusible and remain in suspension in the conventional volatile hydrocarbon solvents and fluid media with which nonleafing metallic flake pigments are conventional employed in the manufacture of metallic pigments and flowable coating formulations; and that the pigments containing the undesirable fines contrast in color and metallic reflective brilliance to nonleafing metallic flake pigment made in accordance with the instant invention.

I have accomplished alleviation and substantially complete elimination in many cases of the discoloration tendencies resulting from inclusion of the detrimental nondiffusible, insoluble colloidal iron and colloidal parent pigment metal fines in nonleafing metallic flake pigment by reacting an acetylacetone, for example, 1,4pentanedione or 2,4-pentanedione, with the fines. I prefer to use the acetylacetone in the amount of about 1 to 10 percent by weight of the pigment. I have found surprisingly that apparently a chelating process forms parent metal acetylacetonate and iron-acetylacetonate metal complexes which are soluble in the volatile hydrocarbons conventionally used in the milling of metallic pigments. Thus, when the resulting mixture is filtered, the undesirable parent metal and iron fines may be removed in the filtrate in their reaction complex form. At room temperature (70°–90° F.) the reaction of the acetylacetone with the undesirable metallic fines is generally complete within 4 hours.

I have also determined that the added acetylacetone responds to best advantage when added to metallic flake pigments produced by a milling process which employs nonleafproducing lubricants. Examples of such lubricants are oleic, lauric and ricinoleic acids, as distinguished from the leaf-producing stearic and/or palmitic fatty acids.

Most representative of volatile hydrocarbon solvents which may be used in producing by wet milling nonleafing metallic flake pigments the purity of which may be improved by practice of the present invention is mineral spirits. The term volatile hydrocarbon solvent is meant to include the wide variety of commercially available aliphatic and aromatic hydrocarbon solvents or thinners employed in the paint and varnish industry, for example, one or more of the group which includes benzene, toluol, high-flash naphtha and the aforesaid mineral spirits and others, all of which are compatible with the above-specified acetylacetone without affecting the ability or preferential affinity of an acetylacetone to combine with and chelate the objectionable colloidal ferrous and parent pigment fines.

The following example is illustrative of the invention.

Performance tests comparing nonleafing aluminum flake dry powder and paste pigments, prepared and modified in accordance with the practice of the invention, to conventionally manufactured unmodified nonleafing aluminum flake dry powder and paste pigments, have established substantially complete absence of streaked and blotched discolored areas in coating films resulting from use of metallic pigment produced by the improved techniques of the invention. The test program included use of a steel ball mill of 2,000-lb. capacity in producing a conventional nonleafing aluminum flake pigment slurry containing about 50 percent metallic aluminum flake. Particle size was 1 to 30 microns as established by microscopic analysis. The mineral spirits volatile hydrocarbon milling liquid used comprised 48 percent by weight of the slurry. 0.2 percent oleic acid was employed as milling lubricant. Tinting or tinctorial strength (G) of the resulting nonleafing aluminum flake pigment was determined according to the method of Rolles and Luyk described in the Journal of Paint Technology, Vol. 40, No. 517, page 86. It was found to be 70.22. Admixture of this pigment slurry to a colloidal iron oxide-pigmented alkyd resin such as conventionally used for automotive coating produced a polychromatic color standard.

A selected sample of this aluminum slurry was divided into two parts of 500 grams each. The slurry contained 250 grams of metallic aluminum flake pigment. To one part 10 grams of an acetylacetone (2,4-pentanedione) were added. The resulting mixture was stirred for 2 hours at room temperature (81° F.). It contained 48.8 percent metallic flake aluminum pigment, 48.8 percent mineral spirits, 0.5 percent oleic acid and 1.9 percent acetylacetone. The other part was stirred under identical conditions except without the addition of the acetylacetone. After about 4 hours both parts were filtered and washed and dried to a 65 percent aluminum metal content. The tinting strength (G) of the untreated sample was measured and was substantially the same as that for the original ball mill slurry product. The part treated with the acetylacetone, on the other hand, showed a tinting or tinctorial strength (G) of 71.8, indicating a substantial lessening in tinting strength caused by chelation of the undesirable colloidal aluminum and iron by the acetylacetone and removal of the reaction product in the filtrate. Mixing of the pigment resulting from the part treated with acetylacetone with a colloidal iron oxide-pigmented alkyd resin coating resulted in a substantial improvement in color clarity and color purity.

This test was repeated with other aluminum flake pigments of varying surface area with similar results. Examination by infrared spectroscopy of the liquid filtrate from the parts treated with acetylacetone showed the presence of iron and aluminum. Separation of these compounds followed by reexamination by infrared spectroscopy confirmed a mixture of about 60 percent aluminum acetylacetonate and 40 percent iron acetylacetonate. Microscopic examination of aluminum pigments treated with acetylacetone showed no change in particle size distribution. This also indicated that colloidal aluminum and iron fines were sequestered by chelation.

I have found it convenient to introduce the acetylacetone such as 1,4 and/or 2,4-pentanedione to a nonleafing aluminum flake pigment in the presence of a volatile hydrocarbon solvent component. This permits addition of acetylacetone during an actual ball-milling operation or to the pigment resulting from ball milling. For example, the acetylacetone may be added during adjustment to form a sludge upon discharge from the ball mill.

Nonleafing aluminum flake paste pigments of the above-described paste compositions have been vacuum dried to provide dry powder pigments which retained the improved characteristics of the modified pastes before vacuum drying of the same; as determined in dried paint or coating formulations made therefrom.

While the invention has been described in terms of preferred embodiments, the claims appended hereto are intended to encompass all embodiments which fall within the spirit of the invention.

Having thus described my invention and certain embodiments thereof, I claim:

1. A process for increasing the purity of nonleafing metallic flake pigment which comprises reacting an acetylacetone with colloidal iron and colloidal parent metal fines in nonleafing metallic flake pigment to form iron and parent metal acetyl acetonate and separating the resulting nonleafing metallic flake pigment in purified form from the iron and parent metal acetyl acetonate.

2. A process for increasing the purity of nonleafing aluminum flake pigment which comprises reacting an acetylacetone with colloidal iron and colloidal parent metal fines in nonleafing aluminum flake pigment to form iron and parent metal acetyl acetonate and separating the resulting nonleafing aluminum flake pigment in purified form from the iron and parent metal acetyl acetonate.

3. The process of claim 1 wherein the acetylacetone is 1,4-pentanedione or 2,4-pentanedione.

4. Nonleafing metallic flake pigment said nonleafing metallic flake pigment in purified form being characterized by a tinting strength which is less than the tinting strength of a corresponding nonleafing metallic flake pigment, the colloidal iron and colloidal parent metal fines in which have not been reacted with an acetylacetone.

5. Nonleafing aluminum flake pigment prepared by the process which comprises reacting an acetylacetone with colloidal iron and colloidal parent metal fines in nonleafing aluminum flake pigment to form iron and parent metal acetylacetonate and separating the resulting nonleafing aluminum flake pigment in purified form from the iron and parent metal acetylacetonate, said nonleafing aluminum flake pigment in purified form being characterized by a tinting strength which is less than the tinting strength of a corresponding nonleafing aluminum flake pigment the colloidal iron and colloidal parent metal fines in which have not been reacted with an acetylacetone.

6. The pigment of claim 4 wherein the acetylacetone is 1,4-pentanedione or 2,4-pentanedione.

7. A process for improving the purity of nonleafing metallic flake pigment which comprises adding an acetylacetone to a slurry of nonleafing metallic flake pigment, thereby chelating colloidal parent metal and ferrous fines in said slurry by reaction with said acetylacetone, and filtering said slurry, thereby removing the reaction products of said parent metal and ferrous fines with said acetylacetone in the resulting filtrate and obtaining a purified nonleafing metallic flake pigment.

8. A process for improving the purity of nonleafing aluminum flake pigment which comprises adding an acetylacetone to a slurry of nonleafing aluminum flake pigment, thereby chelating colloidal parent metal and ferrous fines in said slurry be reaction with said acetylacetone, and filtering said slurry, thereby removing the reaction products of said parent metal and ferrous fines with said acetylacetone in the resulting filtrate and obtaining a purified nonleafing aluminum flake pigment.

UNITED STATES PATENT OFFICE
CERTIFICATE OF CORRECTION

Patent No. 3,615,341                       Dated Oct. 26, 1971

Inventor(s) Rolf Rolles

It is certified that error appears in the above-identified patent and that said Letters Patent are hereby corrected as shown below:

| | |
|---|---|
| Col. 2, line 49 | Change "conventional" to --conventionally--. |
| Col. 2, line 60 | Insert "-" between 4 and pentanedione. |
| Col. 4, line 38 | After "pigment" insert --prepared by the process which comprises reacting an acetylacetone with colloidal iron and colloidal parent metal fines in non-leafing metallic flake pigment to form iron and parent metal acetyl acetonate and separating the resulting non-leafing metallic flake pigment in purified form from the iron and parent metal acetyl acetonate,--. |
| Col. 4, line 71 | Change "be" to --by--. |

Signed and sealed this 25th day of April 1972.

(SEAL)
Attest:

EDWARD M. FLETCHER, JR.
Attesting Officer

ROBERT GOTTSCHALK
Commissioner of Patents